United States Patent
Okuno (10) Patent No.: US 10,953,701 B2
(45) Date of Patent: Mar. 23, 2021

(54) TIRE

(71) Applicant: Sumitomo Rubber Industries, Ltd., Hyogo (JP)

(72) Inventor: Keita Okuno, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 237 days.

(21) Appl. No.: 16/002,552

(22) Filed: Jun. 7, 2018

(65) Prior Publication Data
US 2019/0001755 A1 Jan. 3, 2019

(30) Foreign Application Priority Data
Jun. 28, 2017 (JP) .............................. JP2017-126527

(51) Int. Cl.
B60C 11/13 (2006.01)
B60C 11/04 (2006.01)
B60C 11/03 (2006.01)

(52) U.S. Cl.
CPC ........ B60C 11/1323 (2013.01); B60C 11/042 (2013.01); B60C 11/1315 (2013.01); *B60C 2011/0341* (2013.01); *B60C 2011/0346* (2013.01); *B60C 2200/06* (2013.01)

(58) Field of Classification Search
CPC ............... B60C 11/042; B60C 11/1315; B60C 2011/0346
See application file for complete search history.

(56) References Cited

U.S. PATENT DOCUMENTS

| 8,820,373 B2* | 9/2014 | Mathews | B60C 11/047 |
| | | | 152/209.18 |
| 2014/0299244 A1* | 10/2014 | Okabe | B60C 11/0309 |
| | | | 152/209.25 |
| 2016/0159158 A1* | 6/2016 | Washizuka | B60C 11/0306 |
| | | | 152/209.8 |

FOREIGN PATENT DOCUMENTS

| EP | 0520755 A1 | 12/1992 | |
| EP | 2949482 A1 * | 12/2015 | ......... B60C 11/1384 |
| EP | 2949482 A1 | 12/2015 | |
| JP | H10-024705 A | 1/1998 | |

(Continued)

OTHER PUBLICATIONS

Extended European Search Report issued by the European Patent Office dated Nov. 19, 2018, which corresponds to EP18175225.4-1012 and is related to U.S. Appl. No. 16/002,552.

*Primary Examiner* — Robert C Dye
*Assistant Examiner* — Farah Taufiq
(74) *Attorney, Agent, or Firm* — Studebaker & Brackett PC (57) ABSTRACT

A tire includes a tread portion being provided with a circumferentially extending main groove to define a first land portion between the main groove and a tread edge. The main groove includes a groove bottom, an outer groove wall extending radially outwardly and inclined toward the tread edge, and an inner groove wall extending radially outwardly and inclined toward the tire equator. The groove bottom extends in a zigzag manner in a tire circumferential direction in such a manner as to alternate between a first location where the groove bottom is located nearest to the tire equator and a second location where the groove bottom is located nearest to the tread edge. An angle $\theta 2b$ of the outer groove wall in a groove cross-section at the second location is (Continued)

greater than an angle θ1$a$ of the inner groove wall in a groove cross-section at the first location.

21 Claims, 4 Drawing Sheets

(56) References Cited

FOREIGN PATENT DOCUMENTS

JP 2016-005950 A 1/2016

* cited by examiner

TIRE

BACKGROUND ART

Field of the Disclosure

The present disclosure relates to tires which comprise a tread provided with a main groove, and more particularly to a tire capable of suppressing damage to a groove bottom of the main groove and uneven wear of a tread land portion.

Description of the Related Art

The below Patent Literature 1, for example, discloses a tire which includes a tread portion provided with a circumferentially and continuously extending main groove. The main groove includes a pair of groove edges extending in a straight manner parallel with the tire circumferential direction, while the groove bottom extends in the tire circumferential direction in a zigzag manner. Generally, while the groove bottom of main groove receives a large strain upon tire traveling, the above-mentioned main groove may disperse the strain acting on the groove bottom, resulting in suppressing damage, e.g. cracks of the groove bottom.

In order to provide a zigzag extending groove bottom on a main groove, the main groove necessitates a certain wider groove width. Unfortunately, due to the requirement, axial widths of one or more tread land portions which are adjacent to the main groove become narrower, and thus uneven wear may occur thereon. In particular, when the main groove is provided adjacent to a tread edge to define a first land portion (e.g. a shoulder land portion) between the main groove and the tread edge, uneven wear such as shoulder wear tends to occur on the first land portion since the first land portion basically tends to slip upon grounding.

[Patent literature 1]

Japanese Unexamined Patent Application Publication 10-024705

SUMMARY OF THE DISCLOSURE

In view of the above problems in the conventional art, the present disclosure has an object to provide a tire capable of suppressing damage to a groove bottom of the main groove and uneven wear of a tread land portion.

According to one aspect of the disclosure, a tire includes a tread portion including a tread edge and a tire equator, the tread portion being provided with a circumferentially and continuously extending main groove arranged between the tread edge and the tire equator to define a first land portion between the main groove and the tread edge. The main groove includes a groove bottom having a deepest depth, an outer groove wall extending radially outwardly and inclined toward the tread edge, and an inner groove wall extending radially outwardly and inclined toward the tire equator. The groove bottom extends in a zigzag manner in a tire circumferential direction in such a manner as to alternate between a first location where the groove bottom is located nearest to the tire equator and a second location where the groove bottom is located nearest to the tread edge. An angle $\theta 2b$ with respect to a tire normal line of the outer groove wall in a groove cross-section at the second location is greater than an angle $\theta 1a$ with respect to a tire normal line of the inner groove wall in a groove cross-section at the first location.

In another aspect of the disclosure, a ratio $\theta 2b/\theta 1a$ of the angle $\theta 2b$ to the angle $\theta 1a$ may be in a range of from 1.2 to 6.0.

In another aspect of the disclosure, in a groove cross-section at the second location, a ratio $\theta 2a/\theta 2b$ of an angle $\theta 2a$ with respect to a tire normal line of the inner groove wall to the angle $\theta 2b$ may be in a range of from 1.5 to 6.0.

In another aspect of the disclosure, in the groove cross-section at the first location, a ratio $\theta 1b/\theta 1a$ of an angle $\theta 1b$ with respect to a tire normal line of the outer groove wall to the angle $\theta 1a$ may be in a range of from 1.2 to 6.0.

In another aspect of the disclosure, the angle $\theta 2b$ may be in a range of from 5 to 30 degrees.

In another aspect of the disclosure, the tread portion further may include a second land portion arranged adjacently to the first land portion, and a ratio W1/W2 of an axial width W1 of the first land portion to an axial width W2 of the second land portion may be in a range of from 1.0 to 1.3.

In another aspect of the disclosure, the groove bottom may extend oscillating in a tire axial direction with amplitude of from 0.15 to 0.40 time a groove width of the main groove.

In another aspect of the disclosure, the main groove may include a pair of groove edges extending parallel with the tire circumferential direction.

In another aspect of the disclosure, the main groove may include a pair of groove edges, and at the second location, the groove bottom may be located on a tread edge side of a center position of an axial width between the pair of groove edges.

In another aspect of the disclosure, an axial distance between the groove bottom and the center position may be in a range of from 0.10 to 0.20 time an axial groove width of the main groove.

DESCRIPTION OF THE PREFERRED EMBODIMENTS

An embodiment of the present invention will be explained below with reference to the accompanying drawings.

Figure 1:
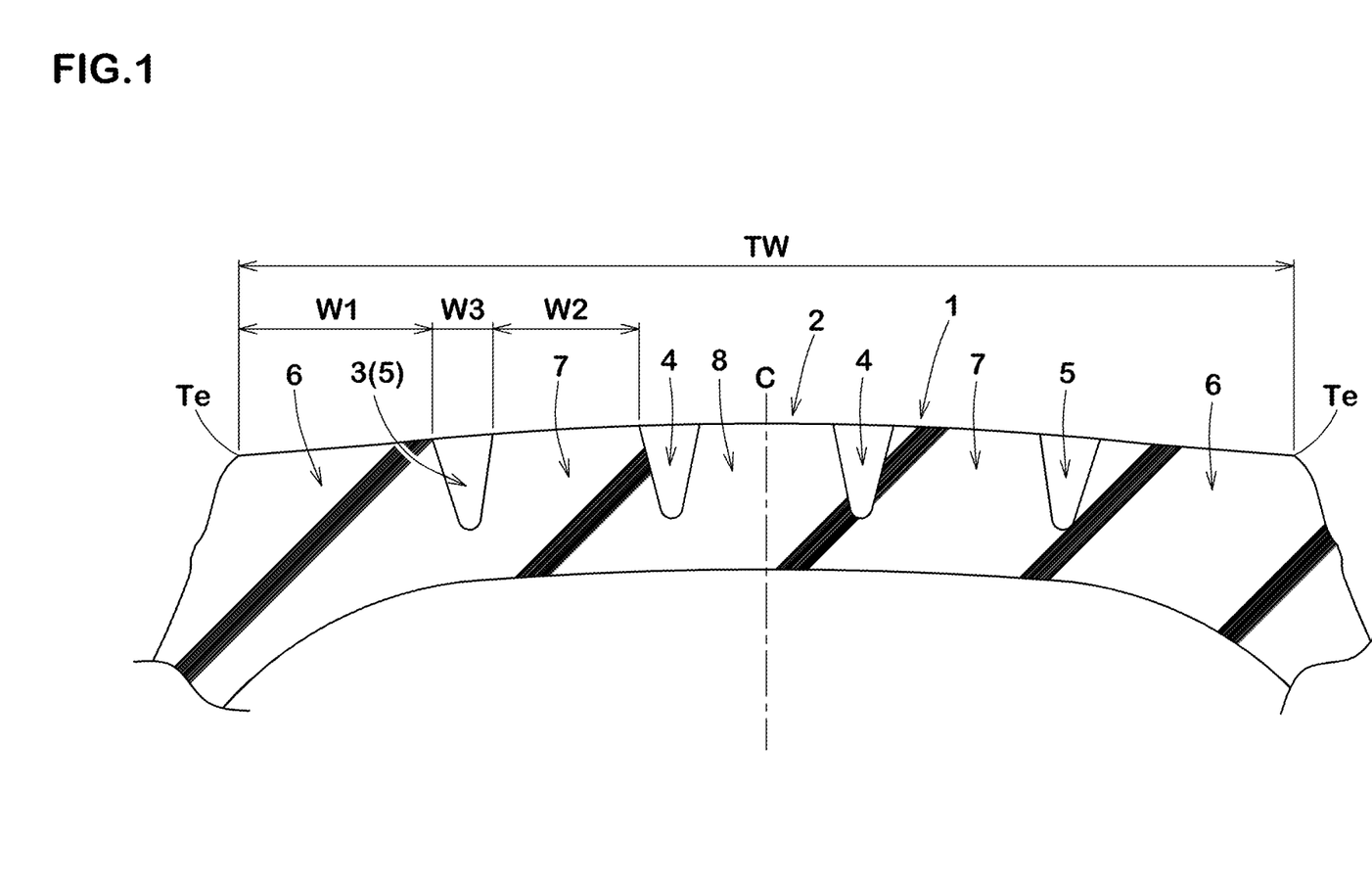
FIG. 1 is a cross-sectional view of a tread portion of a tire in accordance with an embodiment of the present disclosure.

FIG. 1 illustrates a cross-sectional view of a tread portion 2 of a tire 1 in accordance with an embodiment of the present disclosure. Note that FIG. 1 illustrates a tire meridian cross-sectional view including a tire axis of the tire 1 under a standard condition.

In this embodiment, the tire 1, for example, is embodied as a heavy-duty tire for trucks or busses. Note that the tire according to the disclosure is not limited to such an aspect but can be modified as another aspect such as passenger car tire, for example.

As used herein, the standard condition of the tire 1 is such that the tire 1 is mounted on a standard wheel rim and inflated to a standard pressure but loaded with no tire load. In this application including specification and claims, various dimensions, positions and the like of the tire 1 refer to those under the standard condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tread portion 2 is provided with a plurality of circumferentially and continuously extending main grooves 3. At least one of the main grooves 3 is provided between one of tread edges Te and the tire equator C.

The tread edges are the axial outermost edges of the ground contacting patch of the tire which occurs under a standard loaded condition when the camber angle of the tire is zero. The standard loaded condition is such that the tire 1 is mounted on the standard wheel rim and inflated to the standard pressure and loaded with a standard tire load.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

In this embodiment, the main grooves 3, for example, include one or more crown main grooves 4 and one or more shoulder main grooves 5.

The crown main grooves 4 are provided such that one is arranged on each side of the tire equator C. The shoulder main grooves are provided such that one is arranged on each axially outside the crown main grooves 4.

Preferably, groove widths W3 of the main grooves 3, for example, are in a range of from 4.0% to 8.0% of the tread width TW. The tread width TW is the width measured under the standard condition, as the axial distance between the tread edges Te determined as above. Preferably, groove depths of the main grooves 3 are in a range of from 15 to 25 mm for a heavy-duty pneumatic tire, for example. In some preferred embodiments, the groove depths of the main grooves 3 may be in a range of from 20 to 25 mm in order to exhibit superior wet performance.

In this embodiment, the tread portion 2 is divided into two first land portions 6, two second land portions 7 and a third land portions 8 by the above-mentioned main grooves 3. In each side of the tire equator C, the first land portion 6 is defined between the shoulder main groove 5 and the tread edge Te. In each side of the tire equator C, the second portion 7 is defined between the shoulder main groove 5 and the crown main groove 4. The third land portion 8 is defined between the crown main grooves 4.

Figure 2:
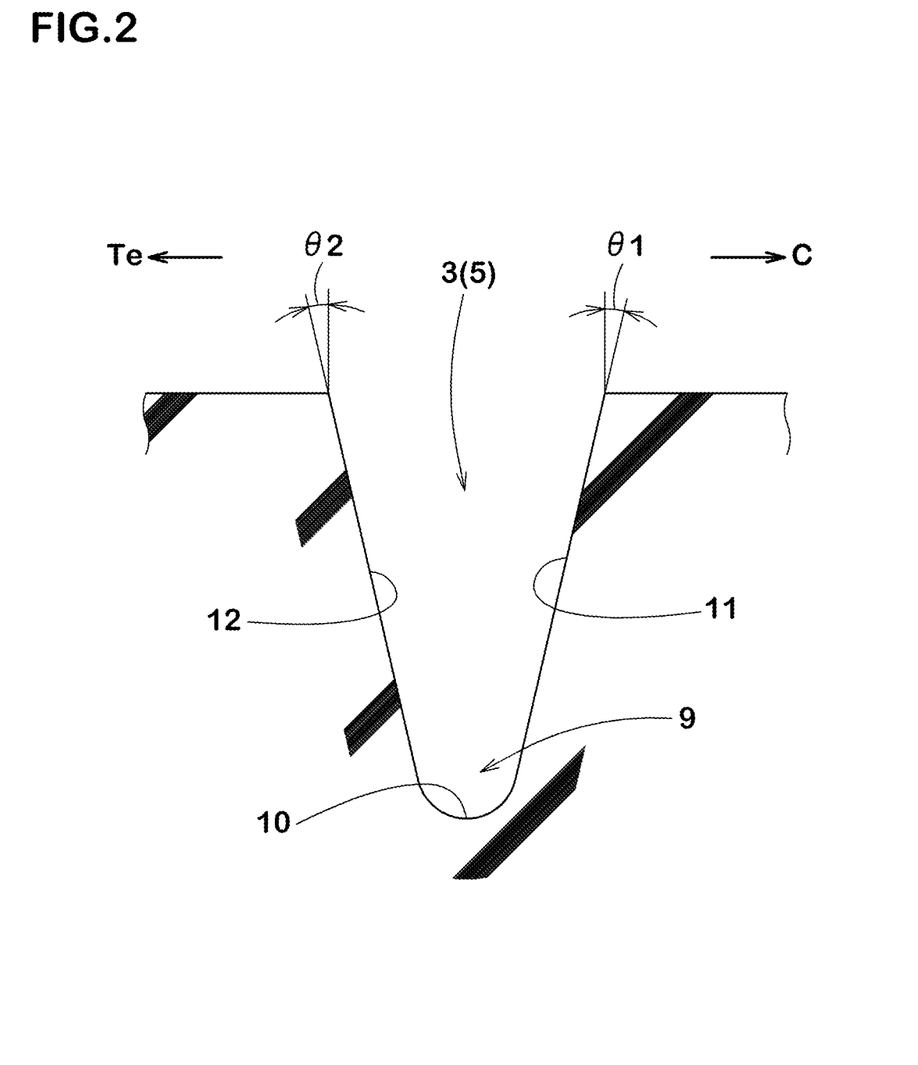
FIG. 2 is an enlarged cross-sectional view of a shoulder main groove.
Figure 3:
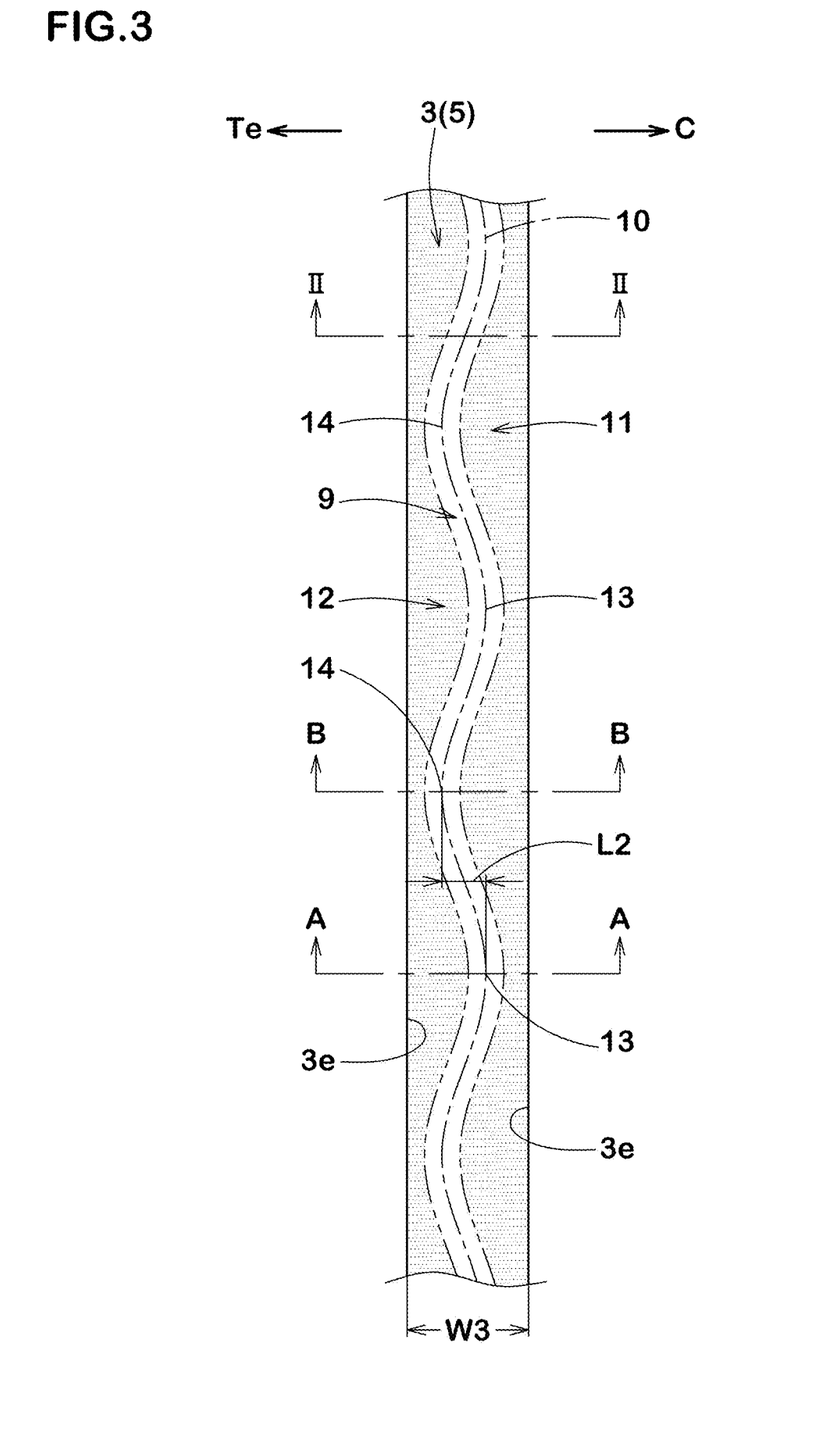
FIG. 3 is an enlarged development view of the shoulder main groove.

FIG. 2 illustrates an enlarged cross-sectional view of one shoulder main groove 5 as a representative aspect of one of the main grooves 3. FIG. 3 illustrates an enlarged development view of one shoulder main groove 5, and FIG. 2 corresponds to a cross-sectional view taken along line II-II of FIG. 3.

As illustrated in FIG. 2 and FIG. 3, each of the main grooves 3 (the shoulder main grooves 5) includes a groove bottom region 9, an inner groove wall 11, and the outer groove wall 12.

As illustrated in FIG. 2, in this embodiment, the groove bottom region 9, for example, includes a bottom surface which is depressed radially inwardly in an arc-shaped manner. Preferably, the bottom surface has a radius of curvature in a range of from 1.0 to 4.0 mm, for example. In this embodiment, the groove bottom region 9 has a groove bottom 10 having a deepest depth. In another aspect of the disclosure, the groove bottom region 9 may include a flat groove bottom surface where the deepest depth portion has a certain axial width. In this aspect, the location of the groove bottom, for example, is defined as the center of the axial width of the flat groove bottom surface.

The inner groove wall 11 is located on the side of the tire equator C (right side in FIG. 2) with respect to the groove bottom 10, and is inclined toward the tire equator C. The outer groove wall 12 is located on the side of the tread edge Te (left side in FIG. 2) with respect to the groove bottom 10 and is inclined toward the tread edge The. In this embodiment, the inner groove wall 11 and the outer groove wall 12 extend in a straight manner in the groove cross-sectional view.

In FIG. 3, the inner groove wall 11 and the outer groove wall 12 are colored to help understand a groove configuration. Further, the respective boundaries between the groove bottom region 9 and the inner groove wall 11 as well as between the groove bottom region 9 and the outer groove wall 12 are shown using two-dot chain lines. Furthermore, the groove bottom 10 is shown using a one-dot chain line. As illustrated in FIG. 3, the groove bottom 10 extends in a zigzag manner in the tire circumferential direction in such a manner as to alternate between a first location 13 where the groove bottom 10 is located nearest to the tire equator C and a second location 14 where the groove bottom 10 is located nearest to the tread edge Te. The main groove 3 as such disperses the strain acting on the groove bottom upon tire traveling, resulting in suppressing damage, e.g. cracks of the groove bottom 10.

In some preferred embodiments, one or more main grooves 3 each include a pair of groove edges 3e extending parallel with the tire circumferential direction. This suppresses uneven wear of the land portions.

As illustrated in FIG. 2 and FIG. 3, each of the inner groove wall 11 and the outer groove wall 12 extends in the tire circumferential direction while periodically varying an angle with respect to a tire normal line. In this embodiment, an angle $\theta 1$ with respect to the tire normal line of the inner groove wall 11 preferably varies in a range of from 3 to 35 degrees, for example. An angle $\theta 2$ with respect to the tire normal line of the outer groove wall 12 preferably varies in a range of from 5 to 40 degrees, for example.

Figure 4A:
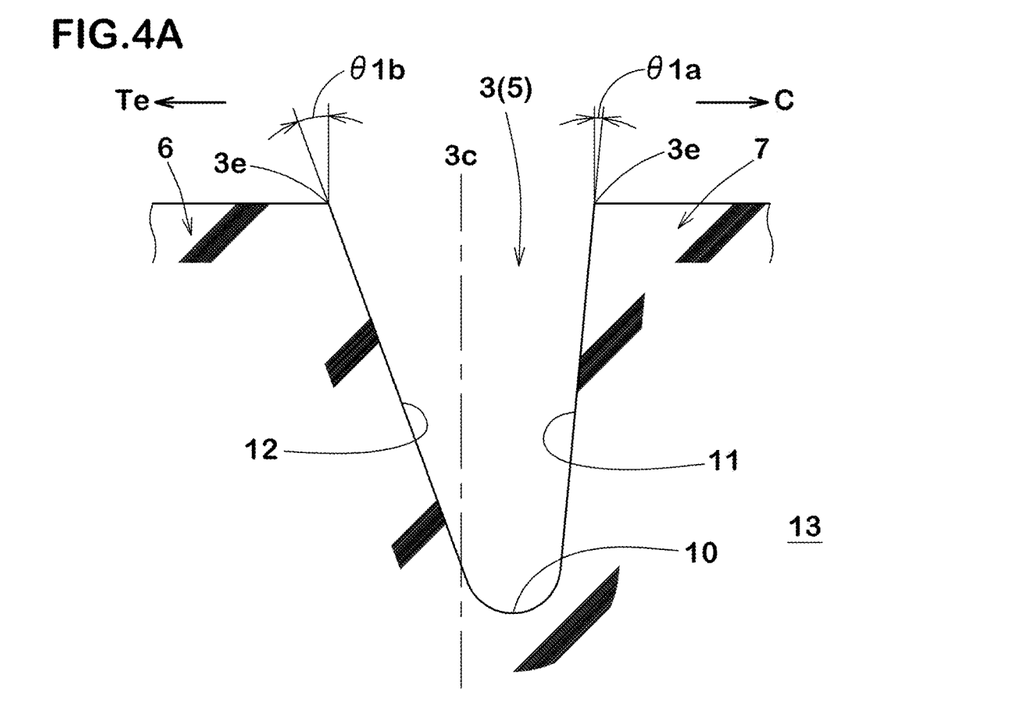
FIGS. 4A and 4B are cross-sectional views taken along lines A-A and B-B of FIG. 3, respectively.
Figure 4B:
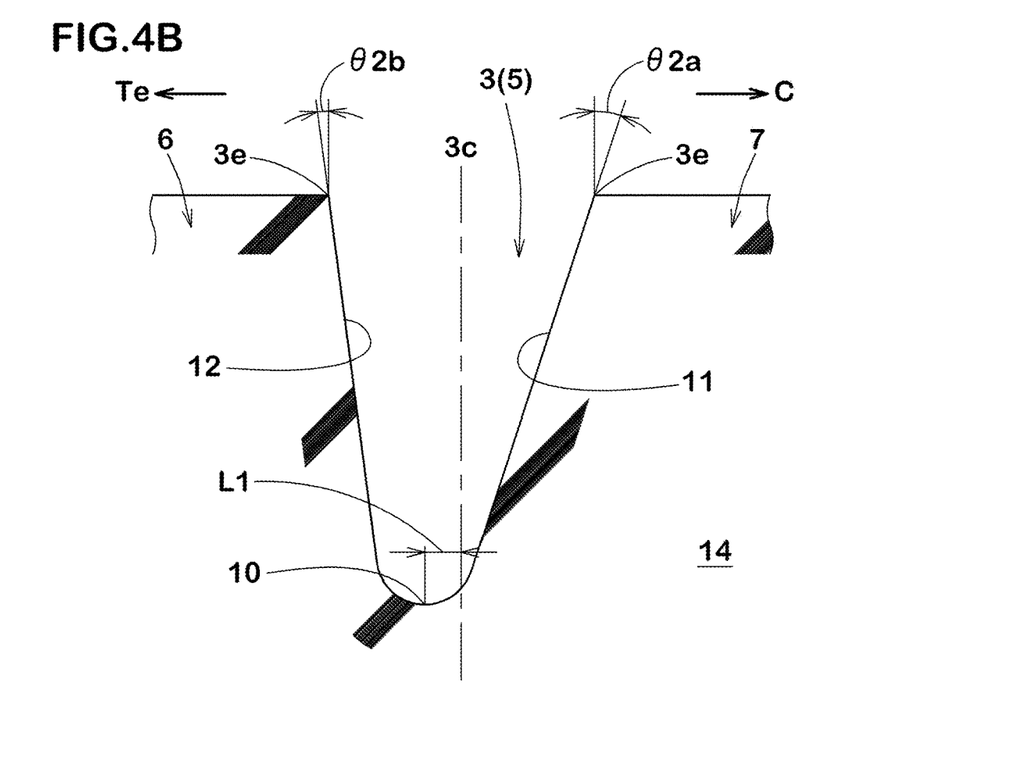

FIG. 4A illustrates a cross-sectional view of the main groove 3 taken along line A-A of FIG. 3 which corresponds to the first location 13. FIG. 4B illustrates a cross-sectional view of the main groove 3 taken along line B-B of FIG. 3 which corresponds to the second location 14. As illustrated in FIGS. 4A and 4B, an angle $\theta 2b$ with respect to the tire normal line of the outer groove wall 12 in the groove cross-section at the second location 14 is greater than an angle $\theta 1a$ with respect to the tire normal line of the inner groove wall 11 in the groove cross-section at the first location 13. Generally, at the second location 14, rigidity of the first land portion 6 which is adjacent to the main groove 3 on the side of the tread edge Te tends to be lower. However, by setting the angle $\theta 2b$ with respect to the tire normal line of the outer groove wall 12 relatively greater, rigidity of the first land portion 6 may increase, resulting in suppressing uneven wear of the first land portion 6.

Preferably, a ratio $\theta 2b/\theta 1a$ of the angle $\theta 2b$ to the angle $\theta 1a$ is equal to or more than 1.2, more preferably equal to or more than 1.4, but preferably equal to or less than 6.0, more preferably equal to or less than 3.0, yet further preferably equal to or less than 2.0 in order for the land portions arranged on both sides the main groove 3 to wear uniformly.

Preferably, the angle θ2b, for example, is of from 5 to 30 degrees, more preferably 5 to 20 degrees. Preferably, the angle θ1a, for example, is of from 3 to 25 degrees, more preferably 3 to 15 degrees.

Preferably, in the groove cross-section at the second location 14, a ratio θ2a/θ2b of an angle θ2a with respect to a tire normal line of the inner groove wall 11 to the angle θ2b is equal to or more than 1.5, more preferably equal to or more than 2.0, yet further preferably equal to or more than 2.5, but preferably equal to or less than 6.0, more preferably equal to or less than 4.0, yet further preferably equal to or less than 3.0. Thus, at the second location 14, uneven wear of the land portions arranged on both sides the main groove 3 can be suppressed further.

Preferably, in the groove cross-section at the first location 13, a ratio θ1b/θ1a of an angle θ1b with respect to a tire normal line of the outer groove wall 12 to the angle θ1a is equal to or more than 1.2, more preferably equal to or more than 3.0, yet further preferably equal to or more than 4.0, but preferably equal to or less than 6.0, more preferably equal to or less than 5.0, yet further preferably equal to or less than 4.5. Thus, at the first location 13, uneven wear of the land portions arranged on both sides the main groove 3 can be suppressed further.

Preferably, at the first location 13, the groove bottom 10 is located on a tire equator C side of the center position 3c of the axial width between the pair of groove edges 3e of the main groove 3. Preferably, at the second location 14, the groove bottom 10 is located on a tread edge Te side of the center position 3c of the axial width between the pair of groove edges 3e of the main groove 3. Due to the above-mentioned configurations, strain acting on the groove bottom 10 can be dispersed sufficiently.

Preferably, at the second location 14, an axial distance L1 between the groove bottom 10 and the center position 3c may be in a range of from 0.10 to 0.20 time the groove width W3 of the main groove 3 in order to achieve the above-mentioned effect while maintaining better wet performance.

As illustrated in FIG. 3, the groove bottom 10 extends oscillating in the tire axial direction with amplitude L2. Here, the amplitude L2 refers to an axial distance of the oscillating groove bottom 10 between the first location 13 and the second location 14. Preferably, the amplitude L2 is equal to or more than 0.15 times the groove width W3 of the main groove 3, more preferably equal to or more than 2.0 times, but preferably equal to or less than 0.40 times, more preferably equal to or less than 0.35 times in order to suppress cracks on the groove bottom while maintaining better wet performance.

As illustrated in FIG. 1, in order to suppress uneven wear of the respective land portions, a ratio W1/W2 of an axial width W1 of the first land portion 6 to an axial width W2 of the second land portion 7 is preferably equal to or more than 1.0, more preferably equal to or more than 1.1, but preferably equal to or less than 1.3, more preferably equal to or less than 1.2.

While the particularly preferable embodiments in accordance with the present invention have been described in detail, the present invention is not limited to the illustrated embodiments but can be modified and carried out in various aspects.

EXAMPLE

Heavy-duty pneumatic tires 275/70R22.5 with a basic structure as described above were manufactured by way of trial based on the specification in Table 1. As a comparative example, a heavy-duty tire having the angle θ2b equal to the angle θ1a was also manufactured. Then, uneven wear resistance, groove bottom durability and wet performance of each test tire was tested. The common specification and the testing method of the test tires are as follows.
  rim size: 8.25×22.5
  tire inner pressure: 720 kPa
Uneven Wear Resistance Test:
  After the test tires were made to run for a certain distance using the following vehicle, the difference of wear amount between the first land portion and the second portion of each test tire was measured. The test results were shown using an index based on the measured value of the comparative example (Reference), wherein the Reference is set to 100. The smaller the index, the better the uneven wear resistance is, i.e. the first land portion and the second portion are worn uniformly.
  Test vehicle: 10-ton truck (2-D type)
  Load condition: half load loaded on front area of platform
  Tire location: all wheels
Groove Bottom Durability Test:
  Using a drum tester, each test tire was made to run continuously under the following condition, and a distance that the tire was able to run without having a crack on the groove bottoms of the main grooves was measured. The test results were shown using an index based on the measured value of the Reference, wherein the Reference is set to 100. The larger the index, the better the groove bottom durability is.
  Tire traveling speed: 80 km/h
  Tire load: 33.83 kN
Wet Performance Test:
  Using an inside drum tester with a 5 mm water deep, each test tire was made to run under the following condition to measure hydroplaning plaining speed. The test results were shown using an index based on the measured value of the Reference, wherein the Reference is set to 100. The larger the index, the better the wet performance is.
  Slip angle: 1.0 degrees
  Tire load: 4.2 kN
The test results are shown in table 1.

TABLE 1

| | (1/2) | | | | | |
|---|---|---|---|---|---|---|
| | Ref. | Ex. 1 | Ex. 2 | Ex. 3 | Ex. 4 | Ex. 5 |
| Inner groove wall angle θ1a at first location (deg.) | 10.0 | 6.0 | 4.1 | 9.5 | 6.0 | 6.0 |
| Outer groove wall angle θ1b at first location (deg.) | 10.0 | 24.9 | 21.1 | 28.6 | 24.9 | 24.9 |
| Inner groove wall angle θ2a at second location (deg.) | 10.0 | 22.0 | 19.2 | 25.4 | 22.0 | 22.0 |

TABLE 1-continued

|  | | | | | | |
|---|---|---|---|---|---|---|
| Outer groove wall angle θ2b at second location (deg.) | 10.0 | 8.7 | 5.4 | 11.9 | 7.2 | 8.4 |
| Angle θ2b/angle θ1a | 1.00 | 1.45 | 1.32 | 1.25 | 1.20 | 1.40 |
| Angle θ2a/angle θ2b | 1.00 | 2.53 | 3.56 | 2.13 | 3.06 | 2.62 |
| Angle θ1b/angle θ1a | 1.00 | 4.15 | 5.15 | 3.01 | 4.15 | 4.15 |
| Uneven wear resistance (index) | 100 | 83 | 87 | 82 | 86 | 83 |
| Groove bottom durability (index) | 100 | 102 | 98 | 103 | 101 | 102 |
| Wet performance (index) | 100 | 100 | 103 | 97 | 100 | 100 |

(1/2)

|  | Ex. 7 | Ex. 8 | Ex. 9 | Ex. 10 | Ex. 11 |
|---|---|---|---|---|---|
| Inner groove wall angle θ1a at first location (deg.) | 6.0 | 6.0 | 4.0 | 6.0 | 6.0 |
| Outer groove wall angle θ1b at first location (deg.) | 24.9 | 24.9 | 30.0 | 24.9 | 24.9 |
| Inner groove wall angle θ2a at second location (deg.) | 22.0 | 22.0 | 32.0 | 13.1 | 17.4 |
| Outer groove wall angle θ2b at second location (deg.) | 12.0 | 18.0 | 24.0 | 8.7 | 8.7 |
| Angle θ2b/angle θ1a | 2.00 | 3.00 | 6.00 | 1.45 | 1.45 |
| Angle θ2a/angle θ2b | 1.83 | 1.22 | 1.33 | 1.51 | 2.00 |
| Angle θ1b/angle θ1a | 4.15 | 4.15 | 7.50 | 4.15 | 4.15 |
| Uneven wear resistance (index) | 84 | 85 | 88 | 85 | 84 |
| Groove bottom durability (index) | 102 | 103 | 104 | 100 | 101 |
| Wet performance (index) | 100 | 99 | 97 | 101 | 100 |

(2/2)

|  | Ex. 12 | Ex. 13 | Ex. 14 | Ex. 15 | Ex. 16 |
|---|---|---|---|---|---|
| Inner groove wall angle θ1a at first location (deg.) | 6.0 | 6.0 | 6.0 | 6.0 | 5.0 |
| Outer groove wall angle θ1b at first location (deg.) | 24.9 | 24.9 | 24.9 | 24.9 | 6.0 |
| Inner groove wall angle θ2a at second location (deg.) | 21.8 | 26.1 | 34.8 | 42.0 | 22.0 |
| Outer groove wall angle θ2b at second location (deg.) | 8.7 | 8.7 | 8.7 | 7.0 | 5.5 |
| Angle θ2b/angle θ1a | 1.45 | 1.45 | 1.45 | 1.17 | 1.10 |
| Angle θ2a/angle θ2b | 2.51 | 3.00 | 4.00 | 6.00 | 4.00 |
| Angle θ1b/angle θ1a | 4.15 | 4.15 | 4.15 | 4.15 | 1.20 |
| Uneven wear resistance (index) | 83 | 83 | 84 | 86 | 88 |
| Groove bottom durability (index) | 102 | 102 | 102 | 103 | 99 |
| Wet performance (index) | 100 | 100 | 99 | 97 | 101 |

(2/2)

|  | Ex. 17 | Ex. 18 | Ex. 19 | Ex. 20 | Ex. 21 |
|---|---|---|---|---|---|
| Inner groove wall angle θ1a at first location (deg.) | 6.0 | 6.0 | 6.0 | 6.0 | 6.0 |
| Outer groove wall angle θ1b at first location (deg.) | 18.0 | 24.0 | 27.0 | 30.0 | 36.0 |
| Inner groove wall angle θ2a at second location (deg.) | 22.0 | 22.0 | 22.0 | 22.0 | 22.0 |
| Outer groove wall angle θ2b at second location (deg.) | 8.7 | 8.7 | 8.7 | 8.7 | 8.7 |
| Angle θ2b/angle θ1a | 1.45 | 1.45 | 1.45 | 1.45 | 1.45 |
| Angle θ2a/angle θ2b | 2.53 | 2.53 | 2.53 | 2.53 | 2.53 |
| Angle θ1b/angle θ1a | 3.00 | 4.00 | 4.50 | 5.00 | 6.00 |
| Uneven wear resistance (index) | 84 | 83 | 84 | 85 | 86 |
| Groove bottom durability (index) | 101 | 102 | 102 | 103 | 103 |
| Wet performance (index) | 100 | 100 | 100 | 98 | 97 |

From the test results, it is confirmed that the example tires suppress strain to the groove bottoms of the main grooves and uneven wear of the land portion while maintaining better wet performance.

What is claimed is:

1. A tire comprising:
    a tread portion comprising a tread edge and a tire equator, the tread portion being provided with a circumferentially and continuously extending main groove arranged between the tread edge and the tire equator to define a first land portion between the main groove and the tread edge;
    the main groove comprising
        a groove bottom region having a groove bottom having a deepest depth, the groove bottom region consisting of a bottom surface depressed radially inwardly in an arc-shaped manner having a radius of curvature in a range of 1.0 to 4.0 mm,
        an outer groove wall extending radially outwardly and inclined toward the tread edge,
        an inner groove wall extending radially outwardly and inclined toward the tire equator, and
        a pair of groove edges extending linearly and in parallel with the tire circumferential direction over an entire length of the main groove;
        the groove bottom extending in a zigzag manner in a tire circumferential direction in such a manner as to alternate between a first location where the groove bottom is located nearest to the tire equator and a second location where the groove bottom is located nearest to the tread edge; and
        an angle $\theta 2b$ with respect to a tire normal line of the outer groove wall in a groove cross-section at the second location being greater than an angle $\theta 1a$ with respect to a tire normal line of the inner groove wall in a groove cross-section at the first location.
2. The tire according to claim 1, wherein a ratio $\theta 2b/\theta 1a$ of the angle $\theta 2b$ to the angle $\theta 1a$ is in a range of from 1.2 to 6.0.
3. The tire according to claim 1, wherein in a groove cross-section at the second location, a ratio $\theta 2a/\theta 2b$ of an angle $\theta 2a$ with respect to a tire normal line of the inner groove wall to the angle $\theta 2b$ is in a range of from 1.5 to 6.0.
4. The tire according to claim 1, wherein in the groove cross-section at the first location, a ratio $\theta 1b/\theta 1a$ of an angle $\theta 1b$ with respect to a tire normal line of the outer groove wall to the angle $\theta 1a$ is in a range of from 1.2 to 6.0.
5. The tire according to claim 1, wherein the angle $\theta 2b$ is in a range of from 5 to 30 degrees.
6. The tire according to claim 1, the tread portion further comprising a second land portion arranged adjacently to the first land portion, and a ratio W1/W2 of an axial width W1 of the first land portion to an axial width W2 of the second land portion being in a range of from 1.0 to 1.3.
7. The tire according to claim 1, wherein the groove bottom extends oscillating in a tire axial direction with amplitude of from 0.15 to 0.40 time a groove width of the main groove.
8. The tire according to claim 1, wherein at the second location, the groove bottom is located on a tread edge side of a center position of an axial width between the pair of groove edges.
9. The tire according to claim 8, wherein an axial distance between the groove bottom and the center position is in a range of from 0.10 to 0.20 time an axial groove width of the main groove.
10. The tire according to claim 2, wherein in a groove cross-section at the second location, a ratio $\theta 2a/\theta 2b$ of an angle $\theta 2a$ with respect to a tire normal line of the inner groove wall to the angle $\theta 2b$ is in a range of from 1.5 to 6.0.
11. The tire according to claim 2, wherein in the groove cross-section at the first location, a ratio $\theta 1b/\theta 1a$ of an angle $\theta 1b$ with respect to a tire normal line of the outer groove wall to the angle $\theta 1a$ is in a range of from 1.2 to 6.0.
12. The tire according to claim 3, wherein in the groove cross-section at the first location, a ratio $\theta 1b/\theta 1a$ of an angle $\theta 1b$ with respect to a tire normal line of the outer groove wall to the angle $\theta 1a$ is in a range of from 1.2 to 6.0.
13. The tire according to claim 2, wherein the angle $\theta 2b$ is in a range of from 5 to 30 degrees.
14. The tire according to claim 3, wherein the angle $\theta 2b$ is in a range of from 5 to 30 degrees.
15. The tire according to claim 4, wherein the angle $\theta 2b$ is in a range of from 5 to 30 degrees.
16. The tire according to claim 2, the tread portion further comprising a second land portion arranged adjacently to the first land portion, and a ratio W1/W2 of an axial width W1 of the first land portion to an axial width W2 of the second land portion being in a range of from 1.0 to 1.3.
17. The tire according to claim 3, the tread portion further comprising a second land portion arranged adjacently to the first land portion, and a ratio W1/W2 of an axial width W1 of the first land portion to an axial width W2 of the second land portion being in a range of from 1.0 to 1.3.
18. The tire according to claim 4, the tread portion further comprising a second land portion arranged adjacently to the first land portion, and a ratio W1/W2 of an axial width W1 of the first land portion to an axial width W2 of the second land portion being in a range of from 1.0 to 1.3.
19. The tire according to claim 5, the tread portion further comprising a second land portion arranged adjacently to the first land portion, and a ratio W1/W2 of an axial width W1 of the first land portion to an axial width W2 of the second land portion being in a range of from 1.0 to 1.3.
20. A tire comprising:
    a tread portion comprising a tread edge and a tire equator, the tread portion being provided with a circumferentially and continuously extending main groove arranged between the tread edge and the tire equator to define a first land portion between the main groove and the tread edge;
    the main groove comprising
        a groove bottom region having a groove bottom having a deepest depth, the groove bottom region consisting of a bottom surface depressed radially inwardly in an arc-shaped manner having a radius of curvature in a range of 1.0 to 4.0 mm,
        an outer groove wall extending radially outwardly and inclined toward the tread edge, and
        an inner groove wall extending radially outwardly and inclined toward the tire equator;
        the groove bottom extending in a zigzag manner in a tire circumferential direction in such a manner as to alternate between a first location where the groove bottom is located nearest to the tire equator and a second location where the groove bottom is located nearest to the tread edge; and an angle $\theta 2b$ with respect to a tire normal line of the outer groove wall in a groove cross-section at the second location being greater than an angle $\theta 1a$ with respect to a tire normal line of the inner groove wall in a groove cross-section at the first location, wherein the groove bottom region has a constant width in a tire axial direction over its entire length in the tire circumferential direction.

21. The tire according to claim 20, wherein the main groove comprises a pair of groove edges, each groove edge of the pair of groove edges extends parallel with the tire circumferential direction over an entire length of the main groove.

\* \* \* \* \*